United States Patent Office 3,428,679
Patented Feb. 18, 1969

3,428,679
TETRACYCLINE HYDROXY CARBOXYLIC ACIDS
Jacques Rondelet, Rixensart, Belgium, assignor to Recherche et Industrie Therapeutiques R.I.T., Genval, Belgium, a corporation of Belgium
No Drawing. Filed Apr. 27, 1965, Ser. No. 451,347
Claims priority, application Great Britain, May 8, 1964, 19,315/64
U.S. Cl. 260—559         8 Claims
Int. Cl. C07c 103/20

ABSTRACT OF THE DISCLOSURE

Tetracycline hydroxy acids are prepared by condensation of a tetracycline antibiotic with an aldehydic carboxylic acid, ester, salt, or hemiacetal thereof.

---

The present invention pertains to novel derivatives of tetracycline antibiotics and to the preparation thereof.

By the terms tetracycline antibiotics, there is meant the group of biologically active derivatives having the hydronaphthacene skeleton

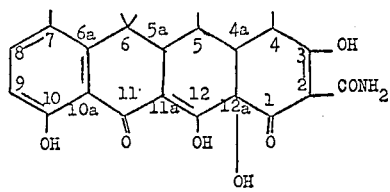

and among which are tetracycline itself, 7-chlorotetracycline, 7-bromotetracycline, 5-oxytetracycline, 4-desdimethylaminotetracycline, 4-desdimethylamino - 7-chlorotetracycline, 4-desdimethylamino-5-oxytetracycline, 6-deoxytetracycline, 6-deoxy - 5-oxytetracycline, 6-demethyltetracycline, 6-demethyl - 7-chlorotetracycline, 6-deoxy-6-demethyltetracycline and 6-deoxy - 6-demethyl - 4-desdimethylaminotetracycline.

The antibiotic compounds of this invention are obtained by interaction of tetracycline antibiotics with aldehydic carboxylic acids of the formula

wherein Y is either —COOH or Alk-COOH, Alk being lower alkylene with straight or branched chain comprising from 2 to 4 carbon atoms or with functional equivalents thereof. Examples of functional equivalents of the aldehydic acid form are the metal salts especially the alkali metal salts or salts with a tertiary aliphatic or heterocyclic amine, the esters and even the hemiacetals formed with lower alkanols of from 1 to 4 carbon atoms.

The interaction is supposed to be that occurring between the 2-carboxamido group of the tetracycline antibiotic with the aldehydic group of the aldehydic acid according to the general reaction of organic chemistry between aldehydes and amide-type compounds, said reaction occurring between one molecule of aldehyde with one molecule of the amide compound, according to the following scheme

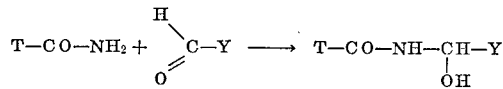

wherein T is the residue of the substituted hydronaphthacene skeleton

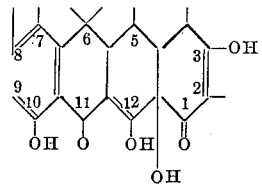

corresponding to a tetracycline antibiotic selected from the group consisting of tetracycline, 7-chlorotetracycline, 7-bromotetracycline, 5-oxytetracycline, 4-desdimethylaminotetracycline, 4-desdimethylamino-7-chlorotetracycline, 4-desdimethylamino-5-oxytetracycline, 6-deoxytetracycline, 6-deoxy-5-oxytetracycline, 6-demethyltetracycline, 6-demethyl-7-chlorotetracycline, 6 - deoxy-6-demethyltetracycline and 6-deoxy-6-demethyl-4-desdimethylaminotetracycline and wherein Y is a residue selected from the group consisting of COO—A and Alk-COO—A, Alk being lower alkylene with straight or branched chain of from 2 to 4 carbon atoms and A being selected from the group consisting of hydrogen, pharmaceutically acceptable cations especially the alkali metal cations and lower alkyl of from 1 to 4 carbon atoms with straight or branched chain.

The reactants may be used either under anhydrous or hydrated form as a little of water does not seem to be deleterious for the reaction.

It may be logically supposed that an acid/base reaction between the carboxylic function and the tetracycline antibiotic (when a dimethylamino group is present in position 4) may also occur for giving the corresponding carboxylate or zwitterion.

Whatever is the exact mechanism, the reaction is carried out in an inert solvent, i.e. a solvent which, under the conditions of the reaction, does not react in an undesired manner with the starting materials. Preferred solvents are those in which the final products are rather insoluble, for instance ethers such as dioxane or tetrahydrofuran and ketones such as acetone or methylethylketone. Nevertheless, other possible insert solvents are for instance alkanols as methanol and esters as ethylacetate and other ones.

The reaction generally takes place at sufficient rate at room temperature but moderate heating is not deleterious as it will appear from the examples.

The reaction time is comprised between about 30 minutes to several tens of hours according to the nature of the reactants and that of the solvent and according to the reaction temperature.

When the reaction is performed in a solvent wherein the final product is substantially insoluble, this one is either recovered by filtration, centrifugation or any other comparable procedure, or by freeze drying when solvent such as dioxane is employed. When the reaction is performed in a solvent wherein the final product is rather soluble, the reaction product may be precipitated by addition of a second miscible solvent—generally a less polar or non-polar miscible solvent—in which the product is appreciably less soluble. For instance, petroleum ether is a precipitating agent when ethylacetate is used as reaction solvent. Petroleum ether may obviously also be used for completing precipitation when a solvent such as acetone is used as reaction solvent. Those skilled in the art will easily find other possible solvent/precipitating systems.

The 1:1 adduct products defined above are carboxylic acids, eventually dimethyl aminocarboxylic acids (when position 4 of the starting tetracycline antibiotic is not desdimethylated) or derivatives thereof.

Thus, as to the acidic function, this one may be present either as free carboxylic group or as pharmaceutically acceptable esters or salts thereof. Examples of pharmaceutically acceptable esters are those with lower alkanols comprising 1 to 4 carbon atoms in straight or branched chain. Examples of pharmaceutically acceptable salts are the metal salts as the sodium, potassium, calcium, magnesium and aluminium salts, the ammonium and substituted ammoniums as from alkylamines and heterocyclic amines, for instance pyrrolidine, piperazine and morpholine, procaine and the like and even from the above said tetracycline antibiotics having a dimethylamino group in position 4. Thus, according to a particular embodiment of this invention, the aldehydic acid is allowed to react with a tetracycline antibiotic in excess for getting the corresponding addition salt.

When a 4-dimethylamino group is present in the starting tetracycline antibiotic, acid addition salts of the final products may also be obtained with pharmaceutically acceptable acids as for instance acetic, citric, tartaric, tartronic, phytic or ascorbic acids and aldehydic acids of the general formula

wherein Y is as defined above and even with the hemiacetals thereof. These pharmaceutically acceptable salts are also comprised in the scope of the present invention.

Thus, according to another particular embodiment of the present invention, the tetracycline antibiotic base is allowed to react with a large excess of the aldehydic acid (2 moles of acid for one mole of tetracycline antibiotic) for getting the corresponding addition salt.

The starting tetracycline antibiotics are known to form complexes with metals such as calcium, magnesium and the like. The same characteristics apply to the novel compounds cited above and the corresponding complexes are obviously also comprised in this invention.

The different derivatives cited above, i.e. the salts, esters and complexes are preferably obtained from the corresponding starting materials.

The novel compounds of this invention are antibiotic compounds presenting improved therapeutic characteristics by comparison with the parent antibiotics and known derivatives of said parent antibiotics but having the same antibiotics spectrum as said parents. More particularly, they are characterized by higher solubility at rather neutral pH values comprised between about 3 and about 8 and their administration gives appreciable antibiotic activity in the blood serum prolonged over a considerable period after administration. They may be administered by either oral or parenteral route but, owing to their good diffusion into the tissues as shown by their excellent tolerance at the site of injection, they are particularly suitable for intramuscular administration.

The novel compounds of this invention may be administered orally using any pharmaceutical form known to the art for such administration or by parenteral route, preferably by intramuscular route.

The minimum daily does is about 100 mg. for the adult human being but higher doses may be administered. Preferred doses are about 200 to 600 mg. a day.

Some of the compounds of this invention as for instance the tetracycline/glyoxylic acid compound are giving stable aqueous solutions for relatively long periods and are particularly suitable for treatment of infectious diseases in man and animals.

The novel products of this invention present one supplemental asymmetric carbon atom when compared with the starting tetracycline antibiotics and can therefore exist in two corresponding optically active epimeric forms, both of them being included in this invention.

The following non limitative examples illustrate the invention.

EXAMPLE 1

Anhydrous tetracycline base (13.332 g., 30 mmoles) is dissolved in 400 ml. of acetone and 2.76 g. (30 mmoles) of glyoxylic acid monohydrate is added to the solution. The reaction medium is stirred for 18 hours at room temperature. After that reaction time, the solvent is evaporated under reduced pressure up to one third of its initial volume and the obtained precipitate is then filtered, washed with 50 ml. of acetone and dried for 48 hours at 60° C. under reduced pressure.

In this way, there is obtained 14.2 g. of a light yellow product with acidulous flavour, supposed to be the 2-(4-dimethylamino-1,4,4a,5,5a,6,11,12a - octahydro - 3,6,10,12,12a-pentahydroxy-6-methyl-1,11-dioxo - 2 - naphthacenecarboxamido),2'-hydroxy-acetic acid.

This product is extremely soluble in water. When tested by the classical colorimetric method for tetracycline, it is shown to yield the equivalent of 80.6% of tetracycline base (calculated equivalent:85.5%) corresponding to a purity of 94.2%. Purity by potentiometric titration is 94.6%. Water content is 2.25% (Karl Fisher method) while the residual acetone amounts to 3.4%.

*Analysis.*—Calculated for $C_{24}H_{26}N_2O_{11}$ (94.2%) +$H_2O$ (2.25%) +$C_3H_6O$ (3.4%): C, 54.39%; H, 5.32%; N, 5.08%. Found: C, 54.59%; H, 5.24%; N, 5.01%.

EXAMPLE 2

Tetracycline base trihydrate (1.495 g., 3 mmoles) is dissolved in 100 ml. of dioxane and 276 mg. (3 mmoles) of glyoxylic acid monohydrate are added thereto. The reaction medium is stirred for 5 hours at 40° C. and then lyophilized. The residue is dried for 24 hours at 55 °C. under reduced pressure to yield a product showing characteristics similar to those described for the product obtained in Example 1.

EXAMPLE 3

To a solution of 9.968 g. of anhydrous tetracycline base in 120 ml. of methanol brought to a final volume of 150 ml. with methanol, there is added a solution of 1.840 g. of glyoxylic acid in 40 ml. of methanol brought to a final volume of 50 ml. with methanol.

The reaction medium is maintained under stirring at room temperature while variations in optical rotation of the medium are followed during 20 hours. After that reaction time, optical rotation is stabilized.

The molecular rotatory power is then $[M]_D^{23°} = -1220$. By addition of one liter of ether under stirring, there is obtained a precipitate which is filtered and dried for 24 hours at 55° C. to yield a product showing characteristics similar to those described for the product obtained in Example 1.

EXAMPLE 4

A 5.303 g. aliquot of the product obtained in Example 1 is dissolved in 89 ml. of methanol and a 4% sodium hydroxide solution in methanol is added thereto under stirring until pH (apparent) value 6.5 is reached.

By addition of 440 ml. of anhydrous ether, there is precipitated the corresponding sodium salt which is filtered in dry atmosphere.

In this way, there is obtained a yellow product which, when dried for 24 hours at 40° C. under reduced pressure, yields the equivalent of 75.7% of tetracycline base. The pH of a 2% aqueous solution of this product is 5.81.

EXAMPLE 5

Anhydrous tetracycline base (2.222 g., 5 mmoles) is dissolved in 75 ml. of acetone and 0.230 g. (2.5 mmoles) of glyoxylic acid monohydrate is added thereto. The solution becomes turbid after about 10 minutes and the medium is still maintained under stirring for 8 hours at room temperature and then concentrated to 25 ml. Precipitation is completed by adding 125 ml. of petroleum ether. The precipitate is collected by filtration and dried under reduced pressure for 48 hours at room temperature.

In this way, there is obtained a yellowish product which is the tetracycline salt of the product of Example 1. This product is highly soluble in water, undergoing slow hydrolysis.

EXAMPLE 6

To a solution of 479 mg. (one mmole) of 7-chlorotetracycline (base) in 30 ml. of acetone, there is added 92 mg. (one mmole) of glyoxylic acid monohydrate and the solution is stirred for 6 hours at room temperature. (Precipitation of the adduct appears about 90 minutes after mixing the reactants.)

After that 6 hours reaction time, precipitation is substantially completed by addition of 150 ml. of hexane. The precipitate is filtered and dried for 24 hours at 60° C. under reduced pressure. Reaction yield is 96.5% of a light yellow product which is extremely soluble in water

EXAMPLE 7

Oxytetracycline base (920 mg., 2 mmoles) is dissolved in 30 ml. of methanol and the pH (apparent) value of the solution is adjusted to 7 with a 4% sodium hydroxide solution in methanol. There is then added 184 mg. (2 mmoles) of glyoxylic acid monohydrate. The mixture is then heated to reflux for two hours.

After that reaction time, the medium is cooled up to room temperature and precipitation of the reaction product is carried out by addition of 150 ml. of anhydrous ether under stirring. After filtration and drying for 48 hours at room temperature under reduced pressure, there is obtained a grey-yellowish product substantially more soluble in water than the starting material.

EXAMPLE 8

Using the technique described in Example 1 but replacing the 30 mmoles of anhydrous tetracycline base by the equivalent amount of respectively:

7-bromotetracycline
4-desdimethylaminotetracycline
4-desdimethylamino-7-chlorotetracycline
4-desdimethylamino-5-oxytetracycline
6-deoxytetracycline
6-deoxy-5-oxytetracycline
6-demethyltetracycline
6-demethyl-7-chlorotetracycline
6-deoxy-6-demethyltetracycline
6-deoxy-6-demethyl-4-desdimethylaminotetracycline the corresponding 1:1 adduct products are obtained.

EXAMPLE 9

Tetracycline hydrochloride (962 mg., 2 mmoles) is dissolved in 30 ml. of methanol and the pH (apparent) value of the solution is adjusted to 7 with a 4% sodium hydroxide solution in methanol. There is then added 184 mg. (2 mmoles) of glyoxylic acid monohydrate. The reaction medium is heated to reflux for one hour under stirring and the solvent is thereafter evaporated under reduced pressure. The residue is suspended in 10 ml. of acetone and then filtered and dried for 24 hours at 55° C. under reduced pressure.

In this way, there is obtained a yellow product showing characteristics similar to those described for the product of Example 1.

EXAMPLE 10

A solution of 444 mg. (1 mmole) of tetracycline (base) and 122 mg. (1.2 mmole) of ethylglyoxylate in 15 ml. of methanol is refluxed for 4 hours. After that reaction time, the solvent is evaporated under reduced pressure.

The residue is suspended in 10 ml. of acetone and 50 ml. of petroleum ether is added thereto. The precipitate is filtered and dried for 24 hours at 55° C. under reduced pressure to yield a yellow product which is the ethyl ester of the product obtained in Example 1.

EXAMPLE 11

Tetracycline base (508 g.) is dissolved in 30 ml. of methanol. The solution is poured into an Erlenmeyer flask containing 201.5 mg. of ethyl glyoxylate ethyl hemiacetal. The mixture is heated to reflux under stirring for 2 hours and the solvent is then evaporated under reduced pressure.

The residue is suspended in 10 ml. of acetone and 50 ml. of petroleum ether is added thereto. The obtained precipitate is filtered and dried for 24 hours at 55° C. under reduced pressure to yield a yellow product comparable to that obtained in Example 10.

EXAMPLE 12

Anhydrous tetracycline base (444 mg., 1 mmole) and 184 mg. (2 mmoles) of glyoxylic acid monohydrate are dissolved in 15 ml. of acetone. The reaction medium is stirred for 16 hours at room temperature. After that reaction time 75 ml. of ether are added with stirring and the obtained precipitate is filtered, washed with 20 ml. of ether and dried for 48 hours at 40° C. under reduced pressure.

In this way, a yellow product is obtained corresponding to the glyoxylic acid addition salt of the product of Example 1.

EXAMPLE 13

Anhydrous tetracycline base (1.695 g.) and 584 mg. of 3-formyl propionic acid are dissolved in 25 ml. of dioxane and the volume of the solution is adjusted to 30 ml. with dioxane. The mixture is then maintained under stirring at room temperature while variations in optical rotation of the medium are followed during 4 hours. After that reaction time, optical rotation is stabilized. Stirring is still maintained for another two hour period and the solvent is then evaporated.

The residue is triturated in 60 ml. of acetone and the insoluble fraction is filtered and dried under reduced pressure at room temperature for 2½ days.

The obtained yellow product which is supposed to be the 3-(4-dimethylamino-1,4,4a,5,5a,6,11,12a-octahydro-3, 6,10,12,12a - pentahydroxy - 6 - methyl - 1,11 - dioxo - 2-naphthacenecarboxamido),3' - hydroxypropionic acid is highly soluble in water. Its metal salts, for instance the sodium salt, are extremely soluble in water.

EXAMPLE 14

To a solution of 7.395 g. of tetracycline base in 250 ml. of acetone, there is added 2.115 g. of γ-formyl-butyric acid. The mixture is maintained under stirring at room temperature for 24 hours. After that reaction time, the solvent is evaporated and the residue is dried under reduced pressure to yield a product which is dissolved in 40 ml. of methanol. Normal sodium hydroxide in methanol is added under stirring to the solution until pH (apparent) value 7.4 is reached. By addition of 200 ml. of ethyl ether, there is obtained a precipitate which is filtered and dried under reduced pressure for 48 hours at room temperature to yield a yellowish product supposed to be the 2-(4-dimethylamino-1,4,4a,5,5a,6,11,12a - octahydro - 3,6,10,12, 12a-pentahydroxy-6-methyl-1,11,-dioxo - 2 - naphthacenecarboxamido),4'-hydroxy butyric acid (sodium salt).

EXAMPLE 15

In 8 l. of methanol are poured under stirring 200 g. of product obtained according to the technique described in Example 1. Citric acid monohydrate (66 g.) is then added thereto and the medium is brought to pH (apparent) value of 6.9 using normal sodium hydroxide in methanol. The medium is stirred for two hours at room temperature and then sterilized by sterilizing filtration. The solution is evaporated up to ⅓ of its initial volume and 15 l. of anhydrous ether are added thereto with stirring. The obtained precipitate is separated by filtration on sterile material under dry atmosphere. The product is then dried for 60 hours under reduced pressure at 50° C. and then divided into 1,000 five ml. vials which are then provided with rubber closures.

Solution is reconstituted before intramuscular administration by addition and shaking with about two ml. of bidistilled nonpyrogen water, preferably containing about 40 mg. of a local anaesthetic as for instance lidocaine hydrochloride.

Suitable administration doses for intramuscular route are about one or two 200 mg. dosage units a day.

EXAMPLE 16

| Ingredients: | mg./capsule |
|---|---|
| Product of Example 1 | 250 |
| Lactose | 140 |
| Light liquid petrolatum | 2 |
| Magnesium stearate | 2 |

The above ingredients are thoroughly mixed and passed through an ASTM No. 25 screen into a No. 1 hard gelatin capsule.

Suitable oral administration doses are about one or two of these capsules a day.

What I claim is:

1. A compound of the formula:

T-CONHCHOH-Y wherein T represents all except the 2-carboxamido group of a member selected from the group consisting of tetracycline, 7-chlorotetracycline, 7-bromotetracycline, 5-oxytetracycline, 4-desdimethylaminotetracycline, 4-desdimethylamino - 7 - chlorotetracycline, 4 - desdimethylamino-5-oxytetracycline, 6-deoxytetracycline, 6-deoxy-5-oxytetracycline, 6-demethyltetracycline, 6-demethyl-7-chlorotetracycline, 6-deoxy-6-demethyltetracycline and 6-deoxy-6-demethyl-4-desdimethylaminotetracycline; Y is selected from the group consisting of COOA and Alk-COOA; Alk is lower alkylene of 2 to 4 carbon atoms; and A is selected from the group consisting of hydrogen, a pharmaceutically acceptable cation, and lower alkyl of 1 to 4 carbon atoms.

2. A compound as claimed in claim 1, wherein T represents all except the 2-carboxamido group of tetracycline, Y is COOA, and A is a pharmaceutically acceptable cation or hydrogen.

3. A compound as claimed in claim 2, wherein Y is COOH.

4. A compound as claimed in claim 1, wherein T represents all except the 2-carboxamido group of 7-chlorotetracycline.

5. A compound as claimed in claim 4, wherein Y is COOH.

6. A compound as claimed in claim 1, wherein Y is COOH.

7. A process for preparing a compound as claimed in claim 1 comprising condensing in an inert solvent a tetracycline selected from the group consisting of tetracycline, 7-chlorotetracycline, 7-bromotetracycline, 5-oxytetracycline, 4 - desdimethylaminotetracycline, 4 - desdimethylamino - 7 - chlorotetracycline, 4-desdimethylamino-5-oxytetracycline, 6-deoxytetracycline, 6-deoxy - 5 - oxytetracycline, 6-demethyltetracycline, 6-demethyl-7-chlorotetracycline, 6-deoxy-6-demethyltetracycline and 6-deoxy-6-demethyl-4-desdimethylaminotetracycline with a compound selected from the group consisting of a compound of the formula

wherein Y is selected from the group consisting of COOA and Alk-COOA, A being hydrogen, a pharmaceutically acceptable cation, or lower alkyl of 1 to 4 carbon atoms, and alk being lower alkylene of 2 to 4 carbon atoms, and a hemiacetal of the formula

wherein A is lower alkyl of 1 to 4 carbon atoms and Y is as defined above.

8. A process for preparing a compound as claimed in claim 3 comprising condensing in an inert solvent tetracycline and glyoxylic acid, the reactants being present in a ratio of from about 0.5 to 2.

References Cited

UNITED STATES PATENTS 3,247,250  4/1966  Tamorria _____ 260—559

ALEX MAZEL, *Primary Examiner.*

ANNE MARIE T. TIGHE, *Assistant Examiner.*

U.S. Cl. X.R.

424—324